(12) United States Patent
Avis

(10) Patent No.: US 6,642,667 B2
(45) Date of Patent: Nov. 4, 2003

(54) AUTOMATIC SHUT-OFF FOR FLASHLIGHTS

(76) Inventor: Deborah Kah Avis, 217 La Puerta Way, Palm Beach, FL (US) 33480

( * ) Notice: Subject to any disclaimer, the term of this patent is extended or adjusted under 35 U.S.C. 154(b) by 0 days.

(21) Appl. No.: 10/237,300

(22) Filed: Sep. 5, 2002

(65) Prior Publication Data

US 2003/0057889 A1 Mar. 27, 2003

Related U.S. Application Data

(60) Provisional application No. 60/316,977, filed on Sep. 5, 2001.

(51) Int. Cl.[7] .............................. H05B 37/00; F21L 4/04
(52) U.S. Cl. ............... 315/200 A; 315/363; 315/185 S; 315/149; 362/202; 362/200; 362/208; 362/800
(58) Field of Search .............................. 315/200 A, 363, 315/185 S, DIG. 4, 149, 150–159; 362/200, 205, 208, 276, 800, 202

(56) References Cited

U.S. PATENT DOCUMENTS

| | | | | |
|---|---|---|---|---|
| 3,535,282 A | | 10/1970 | Mallory | 200/60 |
| 4,450,351 A | * | 5/1984 | Fraden | 250/221 |
| 4,451,871 A | * | 5/1984 | Kirkley et al. | 362/186 |
| 4,461,977 A | * | 7/1984 | Pierpoint et al. | 315/159 |
| 4,851,738 A | * | 7/1989 | Yang | 315/159 |
| 4,875,147 A | | 10/1989 | Auer | 362/205 |
| 5,138,538 A | | 8/1992 | Sperling | 362/205 |
| 6,175,196 B1 | * | 1/2001 | Ragner et al. | 315/200 A |
| 6,249,089 B1 | * | 6/2001 | Bruwer | 315/200 A |
| 6,316,880 B1 | * | 11/2001 | Broadhurst | 315/200 A |

* cited by examiner

*Primary Examiner*—Don Wong
*Assistant Examiner*—Tuyet T. Vo
(74) *Attorney, Agent, or Firm*—Ostrolenk, Faber, Gerb & Soffen, LLP

(57) ABSTRACT

A flashlight includes a motion detector and a light intensity detector for automatic shutoff of the flashlight when unused for a period of time. A timer for turning off the flashlight bulb is reset by the detectors when the flashlight is in motion. The light intensity detector also shuts off the flashlight bulb when the flashlight is placed in a well lit area. Override switches permit a user to maintain power to the flashlight bulb regardless of the detector states.

21 Claims, 3 Drawing Sheets

AUTOMATIC SHUT-OFF FOR FLASHLIGHTS

RELATED APPLICATION

This application is based on and claims priority to U.S. Provisional Application No. 60/316,977, filed Sep. 5, 2001, entitled AUTOMATIC SHUT-OFF FOR FLASHLIGHTS, the entire disclosure of which is incorporated by reference.

FIELD OF INVENTION

This invention relates to a flashlight and more specifically to a flashlight with an automatic shut-off feature.

BACKGROUND OF THE INVENTION

Flashlights are often mistakenly left ON which causes the batteries to run down, for example, when the flashlight is placed somewhere and forgotten while it is ON, or when a user enters a well lit room and neglects to turn the flashlight OFF.

To overcome the foregoing undesirable results, U.S. Pat. Nos. 3,535,282; 4,875,147; and 5,138,538 propose flashlights that automatically shut off. To implement the shut off feature, the referenced patents propose methods involving a shut-off delay means or means such as a button that keeps the flashlight ON only while it is being held down by the user. Such methods require the shut off feature to be repeatedly reset manually by the user, which is a drawback.

It would thus be desirable to have a flashlight with an automatic shut off feature that does not include the drawbacks of the prior art flashlights.

SUMMARY OF THE INVENTION

A flashlight according to the present invention includes a start button, a shut-off timer, and a motion sensor. When the start button is momentarily pressed and released, the flashlight is turned ON and the shut-off timer is set. If the timer is not reset during a predetermined time interval, the light will automatically turn off. The timer can be reset either by the user again pressing the start button, or by operation of the motion sensor due to movement of the flashlight after the predetermined interval of time has elapsed.

To detect the motion of the flashlight a photocell sensor is used to look at the reflected light from the flashlight beam. The small changes of reflected light are sensed to confirm that the flashlight is in use to reset the timer. However, if the flashlight is laid down the reflected light will become stable and the timer circuit will be allowed to timeout and shut off the light.

According to another aspect of the invention, a locking detent or the like can also be provided so that by positive action of the user, the timer can be overridden. This allows the light to remain ON even if it is set down, if the user desires.

According to a further aspect of the invention, the photocell receives light from the side of the flashlight and when the environment around the flashlight is sufficiently bright it will allow the timer to timeout unless the start button is held.

Other features and advantages of the present invention will become apparent from the following description of the invention which refers to the accompanying drawings.

DETAILED DESCRIPTION OF THE FIGURES

Figure 1:
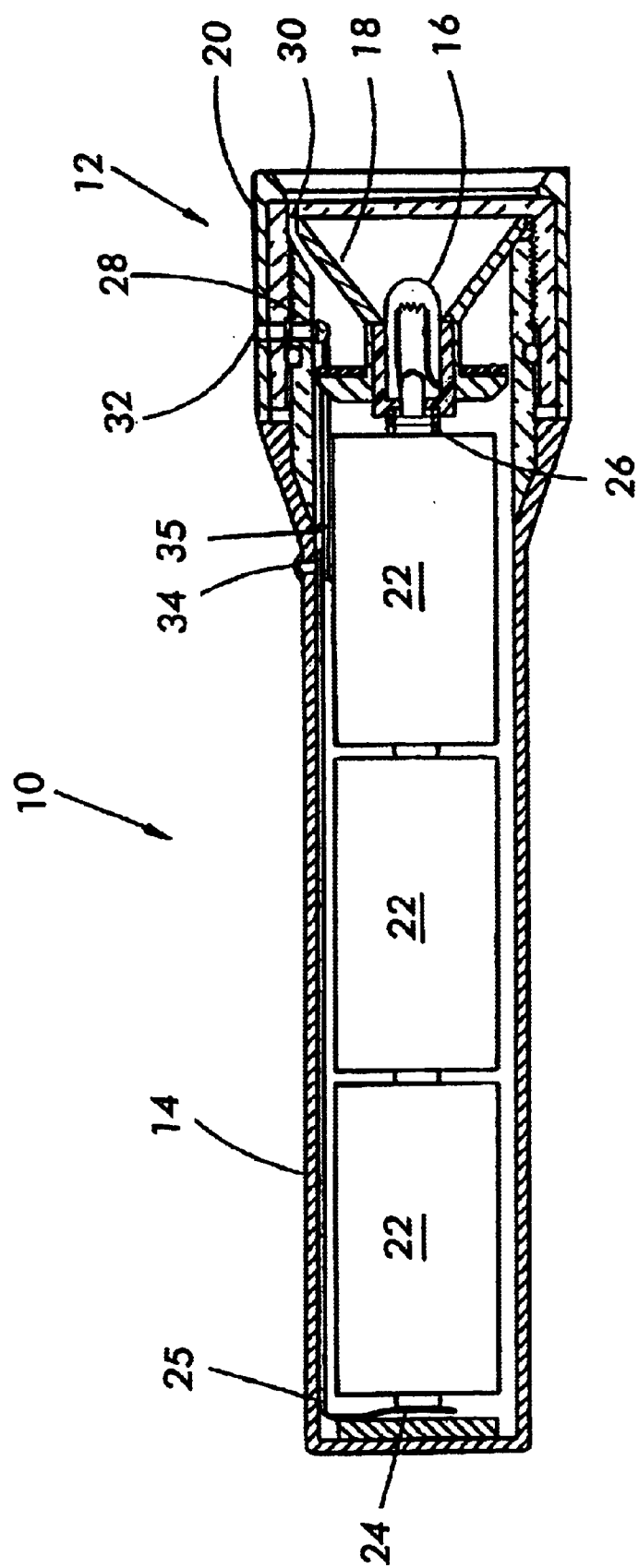
FIG. 1 is a schematic of a flashlight according to an embodiment of the present invention.

FIG. 1 shows a first embodiment of a flashlight 10 according to the present invention. Flashlight 10 includes a light unit 12 and a power supply unit 14. Light unit 12 includes light bulb 16, reflector 18 and chamber 20. Light bulb 16 is disposed in the interior of reflector 18, and reflector 18 is disposed in the interior of chamber 20. Power supply unit 14 is adapted to receive a plurality of power cells 22 such as batteries in the interior thereof. As is well known, power cells 22 are placed in electrical contact with one another in a series arrangement when they are received in the interior of power supply unit 14.

Power supply unit 14 also includes first electrical contact 24 and second electrical contact 26. First electrical contact 24 is in operative electrical contact with one pole of the series-arranged power cells 22 and second electrical contact 26 is in operative electrical contact with the opposing pole of the series-arranged power cells 22. In the preferred embodiment of the present invention, second electrical contact 26 may be a spring contact. Alternatively, the positive poles of power cells 22 can face bulb 16. In that case, second electrical contact 26 would be at the opposite end.

First electrical contact 24 and second electrical contact 26 are arranged to be electrically connected to respective terminals of light bulb 16 in order to supply power to the same. A conventional contact strip 25 may be provided to connect first contact 24 to light bulb 16. A switch 34, as described below, is provided to turn ON the light or to keep it ON.

In the preferred embodiment of the present invention, power supply unit 14 is adapted to serve as a handle for the user and is mechanically coupled to light unit 12. Thus, the power supply unit 14 and light unit 12 constitute an integral, portable flashlight which can be carried by a user easily.

Figure 2:
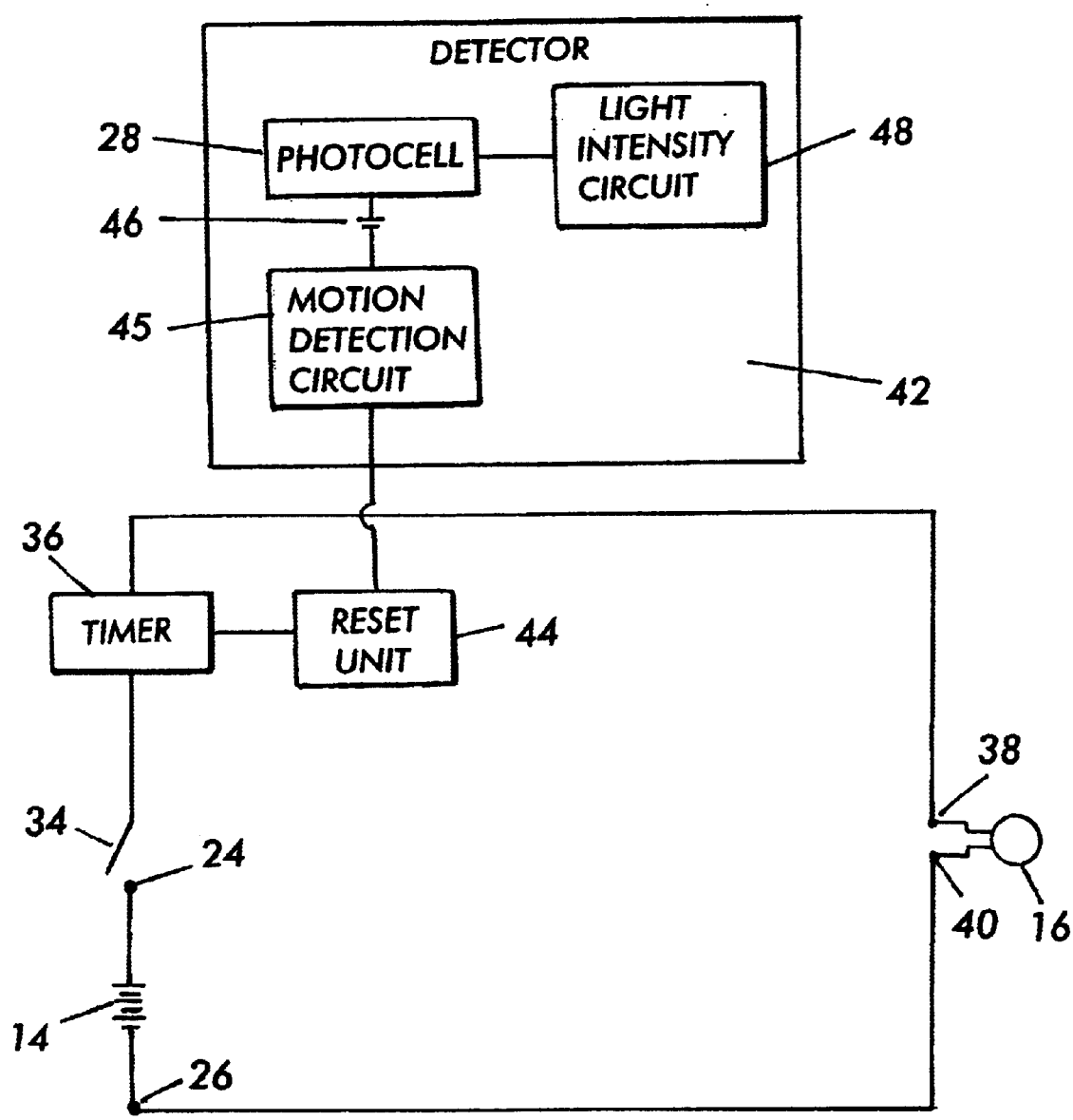
FIG. 2 is a block diagram of the circuitry of an embodiment of a flashlight according to the present invention.

Referring to FIG. 2, flashlight 10 according to the present invention includes an electronic timer 36 of any conventional or desired type including a normally open contact and an actuator circuit for the contact. Timer 36 is operatively connected between first electrical contact 24 and first node 38 of light bulb 16 while second node 40 of light bulb 16 is directly connected to second electrical contact 26. When activated, switch 34 completes the circuit, as shown, to close the normally open contact in timer 36 and electrically connect light bulb 16 to power supply unit 14 for a predetermined interval of time. When the predetermined interval of time has expired, the contact in timer 36 opens, thereby turning light bulb 16 OFF.

Flashlight 10 according to the present invention includes detector 42 which is capable of detecting whether flashlight 10 is moving to indicate that flashlight 10 is in use, and/or whether the intensity of light in the environment surrounding flashlight 10 has reached a predetermined level to indicate that the user has entered a well lit area. When the latter conditions are not satisfied, that is, when detector 42 detects motion and does not detect a predetermined level of light intensity, reset unit 44 of any suitable or desired type causes timer 36 to be activated for another predetermined time interval.

Detector 42 includes photocell 28 which is disposed inside chamber 20. In the preferred embodiment of the present invention, photocell 28 can be part of a light intensity sensor, a motion sensor, or both. Photocell 28 can receive light through a first opening 30 in chamber 20 and through second opening 32 in chamber 20.

First opening 30 is aligned with the field of emission of light of light unit 12 and thus allows a major portion of reflected light from light unit 12 to be received by photocell 28. On the other hand, second opening 32 in chamber 20 is outside of the field of emission of light of light unit 12 and consequently does not receive much of the reflected light from light unit 12. As a result, the light received by photocell 28 from second opening 32 is largely representative of the environment surrounding flashlight 10 with very little influence from the reflected light from light unit 12. Receiving light from second opening 32, which does not include a substantial amount of reflected light, therefore, results in a more accurate measurement of the intensity of light in the environment surrounding flashlight 10.

In the preferred embodiment of the present invention, photocell 28 is operatively connected to motion detection circuit 45 of any known and suitable design that determines whether flashlight 10 is moving by sensing whether there are fluctuations in the reflected light that is received from first opening 30 in chamber 20. Specifically, photocell 28 is connected to motion detection circuit 45 via capacitor 46 so that fluctuations, which are manifested by an AC component from photocell 28, are transmitted to motion detection circuit 45 while the DC component is blocked. The AC signal from photocell 28 is then amplified and sent to reset unit 44 to reset timer 36, thereby timer 36 is activated for another predetermined time interval.

Also, in the preferred embodiment of the present invention, photocell 28 is connected to light intensity circuit 48 of any known and suitable design that determines whether the intensity of the light received from opening 32 in chamber 20 has reached a predetermined level. Specifically, if the pure DC output of photocell 28 reaches a predetermined level, despite deflection of motion, it is concluded that flashlight 10 has entered a sufficiently lit room and the predetermined time interval should be allowed to expire in order to disconnect power from light bulb 16. If not, it is concluded that flashlight 10 should remain in use and thus reset unit 44 causes timer 36 to be activated for another predetermined time interval.

According to an aspect of the present invention, timer 36 is manually activated by button 34 such that when button 34 is momentarily pressed and then released, timer 36 is activated.

According to another aspect of the present invention, flashlight 10 may include an override feature which is activated when button 34 that activates timer 36 is held down by the user. The override feature bypasses timer 36 so that power will be supplied to light bulb 16 for as long as button 34 is held down. Alternatively, the override feature may be activated by a button that can be locked in place such as a button that can be pressed down and locked into a locking detent. The various circuit elements necessary for the operation of flashlight 10 according to the present invention may be disposed on circuit board 35 which may be positioned behind reflector 18.

Figure 3:
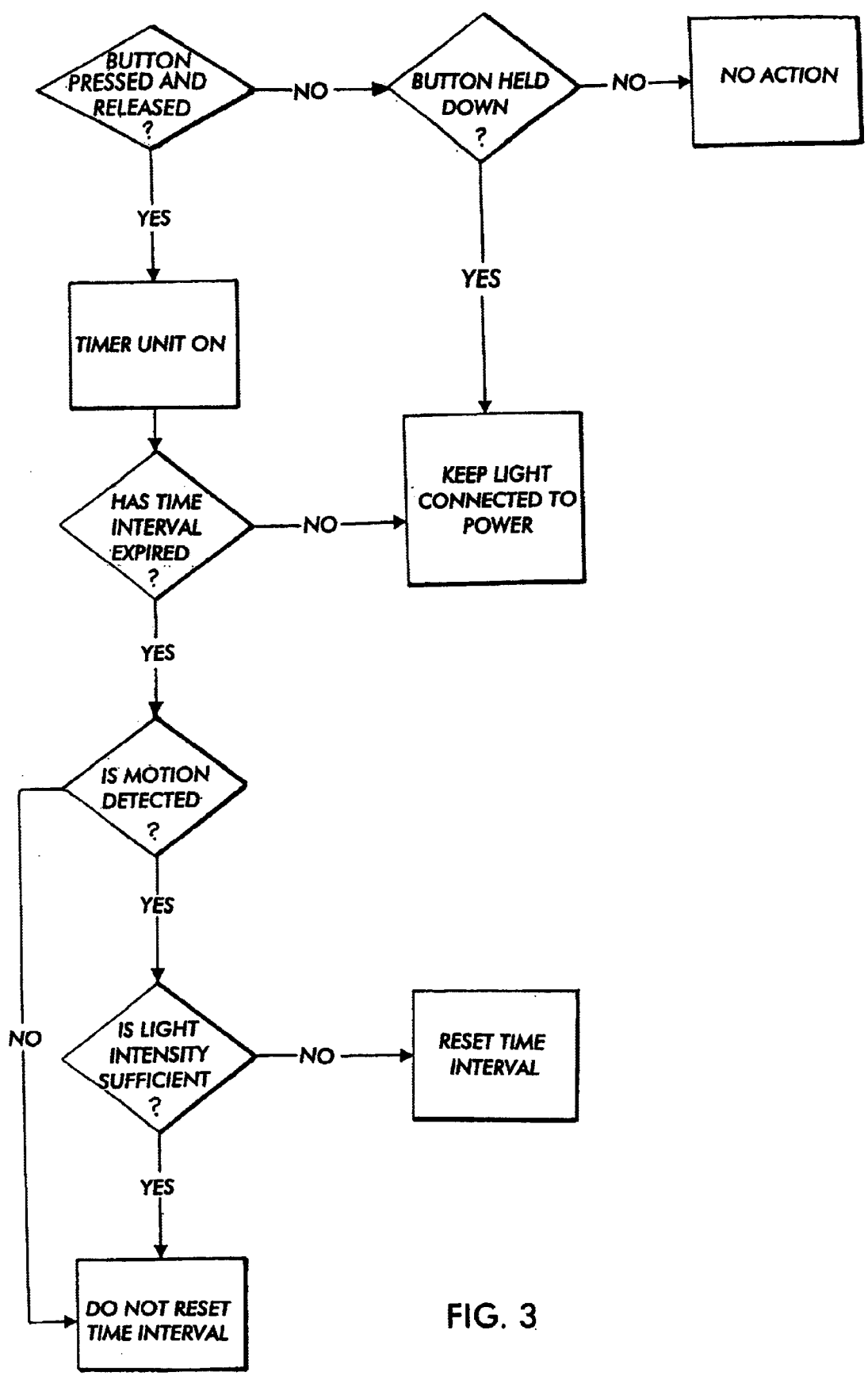
FIG. 3 is a flowchart showing the operational characteristics of a flashlight according to the present invention.

FIG. 3 is a flowchart that illustrates the operational characteristics of flashlight 10.

One skilled in the art will recognize that the invention is not limited to the embodiment disclosed herein and other non-photoelectric motion sensors can be used. For example, motion sensors such as accelerometers, mechanical vibration sensors, mercury switch detectors, or other equivalent devices can also be used.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A portable flash light comprising:
    a light unit;
    a power supply unit for providing electrical power to said light unit;
    a timer capable of being selectively activated for a predetermined time interval, wherein said light unit receives power for the duration of said predetermined time interval and wherein said light unit does not receive power when said predetermined time interval ends;
    a motion detector operable to detect flash light motion; and
    a reset unit that is capable of automatically resetting said timer for a predetermined time interval; wherein said resets unit resets said timer when flashlight motion is detected by said motion detector.

2. The flashlight according to claim 1, wherein motion is detected when said motion detector senses changes in the reflected light from said light unit.

3. The flashlight according to claim 1, wherein said timer is manually activated by a button.

4. The flashlight according to claim 1, wherein said power supply unit is attached to said light unit to form an integral flashlight.

5. The flashlight according to claim 1, further comprising a manual override that overrides said timer so that said light unit may receive power after said predetermined time interval has expired.

6. The flashlight according to claim 1, wherein said light unit and said motion detector are disposed inside a light unit chamber.

7. The flash light
    according to claim 6, wherein said light unit chamber includes an opening through which said motion detector receives light, said opening being oriented to receive reflected light from said light unit.

8. The flashlight according to claim 1, further comprising a light intensity sensor that determines a predetermined light intensity indicating that the environment around said flashlight is of a predetermined brightness; wherein said reset unit does not reset said timer when said light intensity sensor has sensed said predetermined light intensity.

9. The flash light according to claim 8, further comprising:
    an opening away from the path of reflected light from said light unit, wherein said light intensity sensor receives light from the area surrounding said flashlight without substantial contribution from said reflected light.

10. The flashlight according to claim 8, wherein said reset unit does not reset said timer when said light intensity sensor has sensed said predetermined light intensity even if motion is detected by said motion detector.

11. The flashlight according to one of claim 8, wherein said motion detector and said light intensity sensor comprise a common photo cell.

12. A portable flashlight comprising:
    a light unit;
    a power supply unit for providing electrical power to said light unit;
    a timer for setting a predetermined time interval, wherein said light unit receives power for the duration of said predetermined time interval and wherein said light unit does not receive power when said predetermined time interval ends;

a motion sensor operable to detect flashlight motion; and a reset unit that is capable of automatically resetting said timer for a predetermined time interval; wherein said reset unit resets said timer when flashlight motion is sensed by said motion sensor.

13. The flashlight according to claim 12, wherein said motion sensor comprises a photocell.

14. The flashlight according to claim 13, wherein motion is sensed when said motion detector senses changes in the reflected light from said light unit.

15. The flashlight according to claim 12, wherein said light unit is disposed inside a chamber having an opening aligned in the direction of the field of emission of light of said light unit, and said motion sensor receives reflected light through said opening.

16. The flashlight according to claim 12, wherein said timer is manually activated by a button.

17. The flashlight according to claim 12, wherein said motion sensor comprises a mercury switch detector.

18. A The flashlight according to claim 12, further comprising a light intensity sensor for determining a predetermined light intensity, wherein said predetermined light intensity indicates that the environment around said flashlight is of a predetermined brightness, and wherein said reset unit does not reset said timer when the environment around said flashlight is of a predetermine brightness.

19. The flashlight according to claim 18, wherein said light unit is disposed inside a chamber having an opening outside the field of emission of light of said light unit, and said light intensity sensor receives light through said opening.

20. The flashlight according to claim 12, further comprising a manual override that overrides said timer so that said light unit may receive power after said predetermined time interval has expired.

21. The flashlight according to claim 20, wherein said manual override comprises a button.

* * * * *